Figure 1:
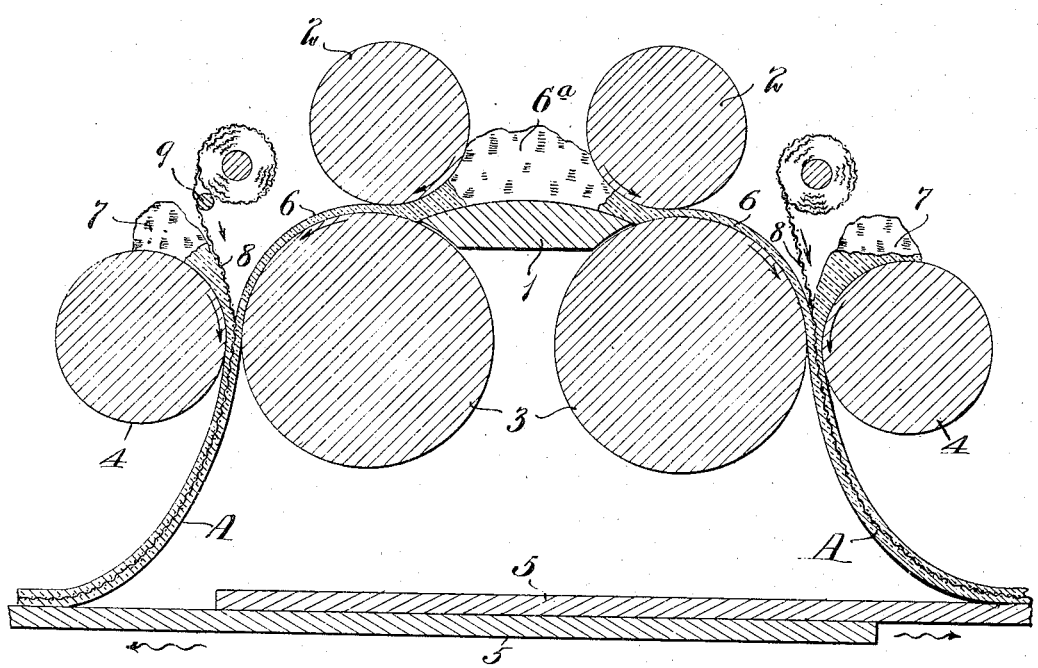

R. A. B. WALSH.
METHOD OF AND MACHINE FOR MAKING WIRE GLASS.
APPLICATION FILED DEC. 2, 1907.

940,835.

Patented Nov. 23, 1909.
2 SHEETS—SHEET 1.

Witnesses:

Inventor,
Robert A. B. Walsh.
By Bakewell Cornwall
attys.

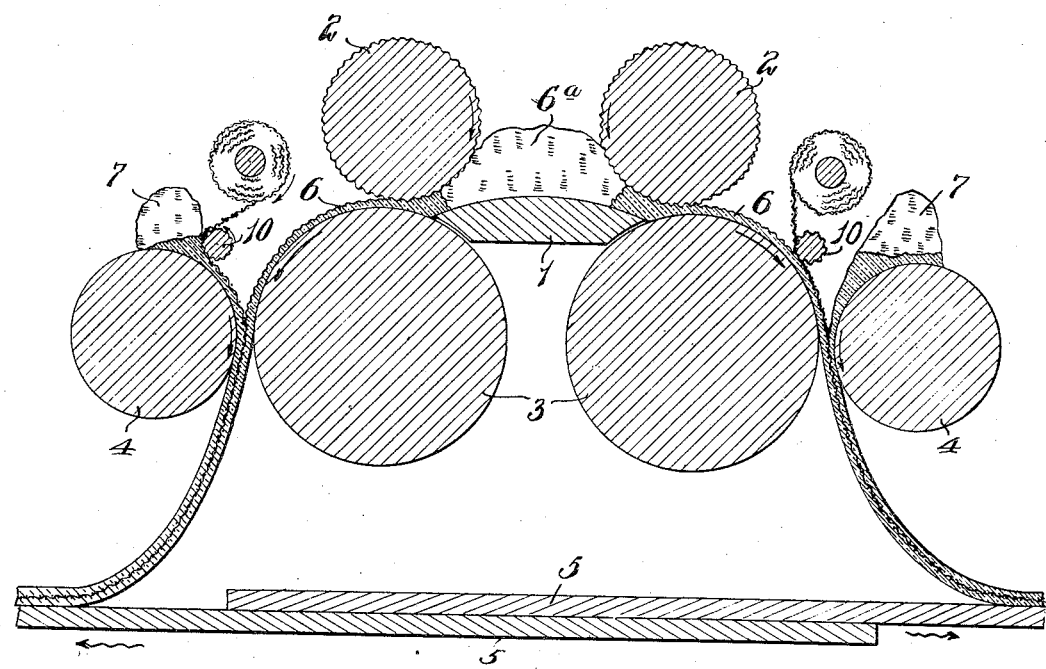

UNITED STATES PATENT OFFICE.

ROBERT A. B. WALSH, OF ST. LOUIS, MISSOURI, ASSIGNOR TO MISSISSIPPI WIRE GLASS COMPANY, OF NEW YORK, N. Y., A CORPORATION OF NEW JERSEY.

METHOD OF AND MACHINE FOR MAKING WIRE-GLASS.

940,835.  Specification of Letters Patent.  Patented Nov. 23, 1909.

Application filed December 2, 1907. Serial No. 404,843.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figure 1 shows one form of apparatus which may be used for practicing my method;
and Fig. 2 shows an apparatus of slightly different form which may be used.

This invention relates to the manufacture of wire glass.

One object of my invention is to provide a novel method of making wire glass which enables me to produce two complete sheets of wire glass from three dumps or masses of molten glass.

Another object is to provide an apparatus for practicing my method.

Briefly described, my method consists in forming a single mass of molten glass into two layers and thereafter applying a finishing coating of molten glass to one surface of each of said layers and interposing a piece of wire mesh between each layer and its finishing coating of molten glass.

In Fig. 1 I have shown one form of apparatus which may be used for practicing my method, this apparatus consisting of a table or supporting surface 1 that is arranged between two pairs of rolls 2 and 3 adjacent the tops of the rollers 3. Rolls 4 coöperate with the rolls 3 to form two pairs of rolls, and the rolls 3 and 4 of each pair are spaced away from each other a distance equal to the thickness of the finished product. A chute or table 5 coöperates with each pair of rolls 3 and 4 to receive the finished sheets that emerge from said rolls, and in the construction herein shown the tables 5 are arranged one upon the other under the rolls 3 and 4 and are adapted to move in opposite directions, as indicated by the arrows in Fig. 1.
In practicing my method with this form of apparatus I dump a mass of molten glass 6ª onto the supporting surface 1, thereby causing said mass to pass between pairs of rolls 2 and 3 located adjacent the ends of the supporting surface and thus produce two independent layers 6 which pass downwardly over the rolls 3 onto the chutes or tables 5. The layers 6 are of about one-half the thickness of the finished sheets, and the top layer
or finishing coating of each sheet is formed by a mass of molten glass 7 that is poured upon the roller 4, said mass flowing downwardly and being spread over the upper surface of the layer 6 by means of the roll 4. A piece of wire mesh or fabric 8 is interposed between the bottom and top layer of each sheet, either simultaneously with the operation of spreading the finishing layer over the bottom layer, or, if desired, the wire mesh can be embedded in the upper surface of the bottom layer prior to covering said layer, or it can be embedded in the mass 7 just prior to the operation of spreading said mass over the bottom layer.

At the right-hand side of Fig. 1 I have shown the wire mesh as being interposed between the bottom layer and the finishing coating of the sheet A simultaneously with the operation of spreading the finishing coating over said layer, while at the left-hand side of said figure I have shown the wire mesh as passing underneath a tension device 9 so that it will cut its way into the mass of molten glass 7 and thus be embedded therein just prior to the operation of spreading said mass over the bottom layer.

In Fig. 2 I have shown an apparatus in which the rolls 2 are provided with corrugated surfaces so that the bottom layers will be positively fed downwardly. This apparatus also comprises corrugated rolls 10 that may coöperate with either the rolls 4 or 3 to positively force the wire mesh into the top or bottom layers and thus completely cover said mesh before the top and bottom layers are combined together.

At the right-hand side of Fig. 2 I have shown the corrugated roller 10 as coöperating with the roll 3 and at the left-hand side of this figure I have shown the corrugated roller 10 coöperating with the roll 4. When the roller 10 is arranged to coöperate with the roll 4 the mass 7 will be formed into a complete top layer before the top and bottom layers are combined together by the rolls 3 and 4.

As the wire mesh is completely covered by the molten glass as soon as it becomes heated by contact with said glass, said mesh will not be exposed to the air after it has become heated and accordingly will not oxidize and thus detract from the appearance of the finished sheet. Fewer workmen are required in manufacturing wire glass according to this method in view of the fact that two sheets can be formed from three instead of four dumps as was necessary in the methods heretofore practiced. Furthermore, the finished sheet has a perfectly smooth and even top surface as the irregularities in the upper surface of the bottom layers, caused by embedding the wire therein, are completely filled in by the finishing coating that is applied to the bottom layer.

Having thus described my invention, what I claim as new and desire to secure by Letters Patent is:

1. The method of making wire glass, which consists in stretching out or elongating a mass of molten glass to form two independent layers covering one surface of each of said layers with a coating of molten glass, and interposing a piece of wire fabric between each of said layers and its coating of glass; substantially as described.

2. The method of making wire glass, which consists in rolling a mass of molten glass into two independent layers, arranging a piece of wire mesh or fabric upon each of said layers, and thereafter covering said wire fabric with a coating of glass; substantially as described.

3. The method of making wire glass, which consists in dumping a mass of molten glass onto a table, rolling each half of said mass in opposite directions to form two independent layers, passing said layers between horizontally disposed rolls, covering one face of each of said layers with a mass of molten glass, and arranging a piece of wire mesh between each of said layers and its covering of glass; substantially as described.

4. The method of making wire glass, which consists in dumping a mass of molten glass onto a table arranged between two pairs of rolls whereby said mass is rolled in opposite directions to form two independent layers, spreading a mass of molten glass over one face of each of said layers, and arranging a piece of wire fabric between each of said layers and the mass of molten glass applied thereto; substantially as described.

5. The method of making wire glass, which consists in rolling or stretching out a mass of molten glass into the form of two independent layers, feeding said layers into approximately vertical positions, arranging pieces of wire mesh upon one surface of each of said layers and forming independent layers from masses of molten glass and combining them with the layers first referred to so as to form two complete sheets of wired glass; substantially as described.

6. The method of making wire glass, which consists in dumping a mass of molten glass onto a table, rolling each half in an opposite direction to form an independent layer, applying a mass of molten glass to one surface of each of said layers and spreading it thereover to form a finished sheet, interposing a piece of wire fabric between the layer and the glass that is applied thereto, and positively forcing said wire mesh into the molten glass before it is applied to said layer; substantially as described.

7. The method of making wire glass, which consists in forming a mass of molten glass into two independent layers, feeding said layers into vertical positions, forming coöperating layers from independent masses of molten glass, arranging pieces of wire fabric between the coöperating layers and the layers that are formed from the single mass, and thereafter combining said layers together; substantially as described.

8. The method of making wire glass, which consists in stretching out or elongating a single mass of molten glass into two independent layers, forming coöperating layers from independent masses of molten glass, simultaneously forcing pieces of wire mesh into said coöperating layers, and thereafter combining the coöperating layers with the layers first referred to to form two finished sheets of wired glass; substantially as described.

9. The method of making wire glass, which consists in rolling a mass of molten glass in opposite directions to form two independent layers, forcing a piece of wire fabric into each of said layers, and thereafter applying a coating of molten glass to each of said layers to form two independent sheets; substantially as described.

10. The method of making wire glass, which consists in forming a single mass of molten glass into two independent layers, feeding pieces of wire mesh over said layers as they are being formed, and thereafter covering each layer with a coating of molten glass; substantially as described.

11. An apparatus for making wire glass, comprising means for forming a single mass of molten glass into two layers, and means for spreading a mass of molten glass over each layer to form a finishing coating therefor; substantially as described.

12. An apparatus for making wire glass, comprising means for forming a single mass of molten glass into two layers, means for applying a finishing layer of molten glass to each of said layers to produce two complete sheets, and means for arranging a piece of wire mesh between the two layers of each sheet; substantially as described.

13. An apparatus for making wire glass, comprising means for rolling a mass of molten glass into two layers, means for embedding a piece of wire mesh in each layer, and means for covering each layer with a finishing coating of molten glass; substantially as described.

14. An apparatus for making wire glass, comprising a supporting surface, a pair of horizontally disposed rolls arranged adjacent the ends of said support whereby a mass of molten glass on said surface will be formed into two layers, rolls coöperating with the lower roll of each pair for spreading a finishing layer of molten glass over each layer, and means for arranging a wire mesh between the bottom layer and finishing coating of each sheet; substantially as described.

15. An apparatus for making wire glass, comprising a horizontal supporting surface, a pair of rolls arranged at each end of said supporting surface for rolling a mass of glass on said surface into two independent layers, a roll coöperating with one roll of each pair for spreading a mass of molten glass over each layer to form a finishing coating therefor, and means for completely embedding a piece of wire mesh in one of the layers of each sheet; substantially as described.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.